July 28, 1959     B. SCHLESSEL     2,897,441
PANORAMIC TEST SYSTEM
Filed Dec. 27, 1955
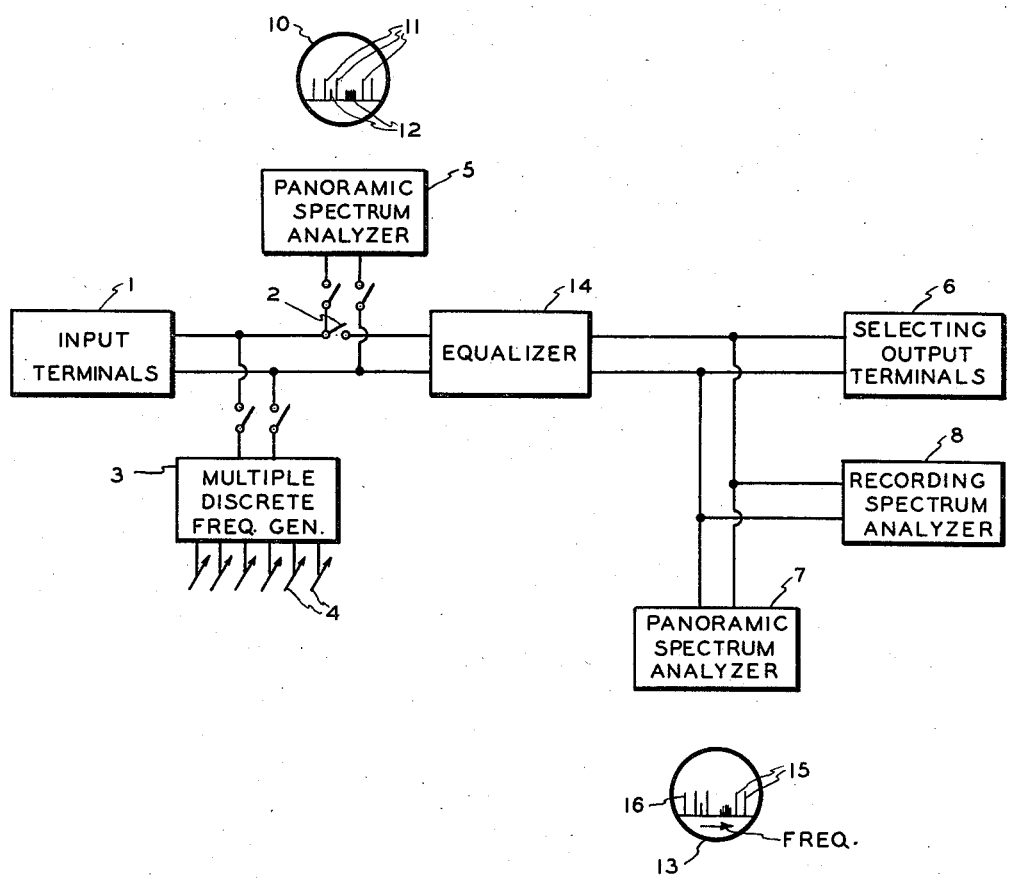
INVENTOR
BERNARD SCHLESSEL
BY *Hyman Hurwitz*
ATTORNEY

2,897,441

PANORAMIC TEST SYSTEM

Bernard Schlessel, Brooklyn, N.Y.

Application December 27, 1955, Serial No. 555,344

2 Claims. (Cl. 324—58)

The present invention relates generally to testing electrical properties of long lines, and more particularly to testing the frequency response of carrier lines without disturbing the operation of the lines.

It is a problem in carrier line installation, adjustment, equalization, maintenance or operation, to measure rapidly the frequency response of the lines. When a line is in operation, and carrying signals of various types, it is undesirable to introduce test signals into the line which might interfere with the signals already present. For that reason, the conventional mode of testing the frequency response of circuits, which comprises transmitting the output of a frequency swept oscillator through the line, and measuring the response of the line, is not practicable.

In accordance with the present invention, carrier lines are tested for frequency response by applying to one end of the line under test a plurality of discrete frequencies simultaneously, preferably all at the same amplitude, and the frequencies being deliberately selected to fall at positions of the line's frequency spectrum which are unoccupied. The latter positions may be determined by measuring the frequency content of the line by means of a conventional spectrum analyzer, and inserting test signals at available frequency positions, as indicated by the spectrum analyzer. Where available frequency positions are known, by virtue of the known service for which the line is intended and used, this procedure may be unnecessary.

The response of the line to the inserted frequencies, and, if desired, to those in any event present, may then be measured at the remote end of the line, by means of a conventional spectrum-analyzer, of the indicating or recording type, and the frequency response curve of the line plotted. The signals in any event present on the line may be of constant amplitude, for example pilot tones, and in such case are available for the test if their amplitudes relative to the amplitudes of the inserted test signals are known. The facts may be discovered by spectrum analysis at the input end of the line. On the other hand, only the test signals may be utilized, for purpose of test. Since they may be of uniform amplitude at the input end of the line, the spectrum analyzer at the output end provides a direct plot of frequency response, if the normally present signals be ignored. Clearly, the line and its associated devices may be readily equalized, or otherwise adjusted, when the results of the above described tests are known.

It is, accordingly, a broad object of the present invention to provide a novel system for testing the frequency response of carrier lines without interfering with the normal operation of the lines.

It is a more specific object of the invention to provide a system for testing the frequency response of carrier lines by inserting into the lines a plurality of signals at discrete frequencies, and of equal amplitudes, at frequency positions which are not occupied during the normal operation of the lines.

The above and still further features, objects, and advantages of the invention will become apparent upon consideration of the following detailed description of a specific embodiment of the invention, especially when taken in conjunction with the accompanying drawing, wherein:

The single figure of the drawing is a schematic circuit diagram of a system in accordance with the invention.

Proceeding now by reference to the accompanying drawing, the reference numeral 1 denotes an input terminal for a carrier transmission line 2, the input terminal supplying to the line 2, in general, a plurality of signals, each signal occupying a predetermined position in the frequency spectrum allocated to the line 2. The signals may comprise pilot tones, modulated carriers, or the like, and are at fixed frequency positions.

A multiple discrete frequency generator 3 is connected or coupled to line 2. The generator 2 is capable of supplying a relatively large number of frequencies, of uniform amplitude, to line 2, and the frequencies of the several signals may be controlled by means of suitable manual controls 4.

The signals present on the line 2 may be observed by means of a conventional panoramic adapter or receiver, or spectrum analyzer, 5, connected to the line 2 beyond the point of connection of generator 3. The frequencies provided by the source 3 may then be adjusted to fill, with suitable intervals, the gaps between the signals in any event present on line 2, and deriving from input terminals 1.

At the remote end of line 2 is connected output terminals, 6, arranged and adapted to separate the several signals present on the line, and deriving from input terminals 1, and to route these to desired destinations, or to utilize these.

Connected adjacent the output terminals 6 is a further panoramic adapter, receiver, or spectrum analyzer 7, duplicating the device 5, or a recording spectrum analyzer 8. By observing the responses of the spectrum analyzers 7, 8, or one of these, at each of the frequencies introduced by the generator 3, the frequency response of the line 2 may be visualized, and in the event equalization or other adjustment of the line or any of its terminations becomes necessary, the visual indication provided by the panoramic display is of value in facilitating the necessary operations.

For example, the reference numeral 10 denotes the face of the cathode ray tube indicator of the panoramic spectrum analyzer 5, showing signals, 11, of equal amplitude which are in non-interfering relation to signals 12, originating at input terminals 1. The reference numeral 13 denotes the face of visual panoramic spectrum analyzer 7, of the type employing a cathode ray tube indicator. Were the line 2 perfectly equalized, as by equalizer 14, the displays presented at indicator faces 10 and 13 would be identical. It is clear, from the illustration, that the higher frequencies are more severely attenuated by the line 2 than are the lower frequencies, since visual pips or indications, 15, at the right side of the indicator face 13 are of lower amplitude than those, 16, at the left side. Moreover, it is not necessary to have indicator face 10 available to determine that the recited conditions exist, the responses being relative.

The recording panoramic spectrum analyzer 8 may be of the photographic type, as illustrated and described in U.S. Patent No. 2,214,342 to Neufeld, or of the type employing a mechanical recording stylus, and illustrated and described in U.S. Patent No. 2,632,036 to Hurvitz. Still other types of recorders may be employed, if desired, and I do not desire to be limited to any specific construction or arrangement.

While I have described and illustrated one specific example of the present invention, it will be clear that variations of the specific details of construction may be resorted to without departing from the true spirit of the invention as defined in the appended claims.

What I claim is:

1. A system for testing the frequency response of a long carrier transmission line, wherein said line carries at least one signal continuously in normal service, wherein the system is operative without interrupting that service, comprising means for impressing on said line at one position thereof a distribution of discrete continuous wave signals of known amplitudes subsisting at predetermined single frequencies all non-interfering with said at least one signal, and a panoramic spectrum analyzer coupled with said line at a position thereof remote from said one position, said panoramic spectrum analyzer arranged and adapted to present a visual display of all said signals in terms of their relative amplitudes and of their frequencies.

2. The combination in accordance with claim 1 further comprising a panoramic spectrum analyzer located at said one position for visually displaying the frequency of said at least one signal and the frequencies and amplitudes of said discrete wave signals.

References Cited in the file of this patent

UNITED STATES PATENTS

| | | |
|---|---|---|
| 1,816,958 | Clark | Aug. 4, 1931 |
| 2,159,790 | Freystedt | May 23, 1939 |
| 2,476,992 | Miller | July 26, 1949 |
| 2,666,899 | Smullin | Jan. 19, 1954 |
| 2,733,433 | Morrison | Jan. 31, 1956 |